United States Patent Office 3,705,017
Patented Dec. 5, 1972

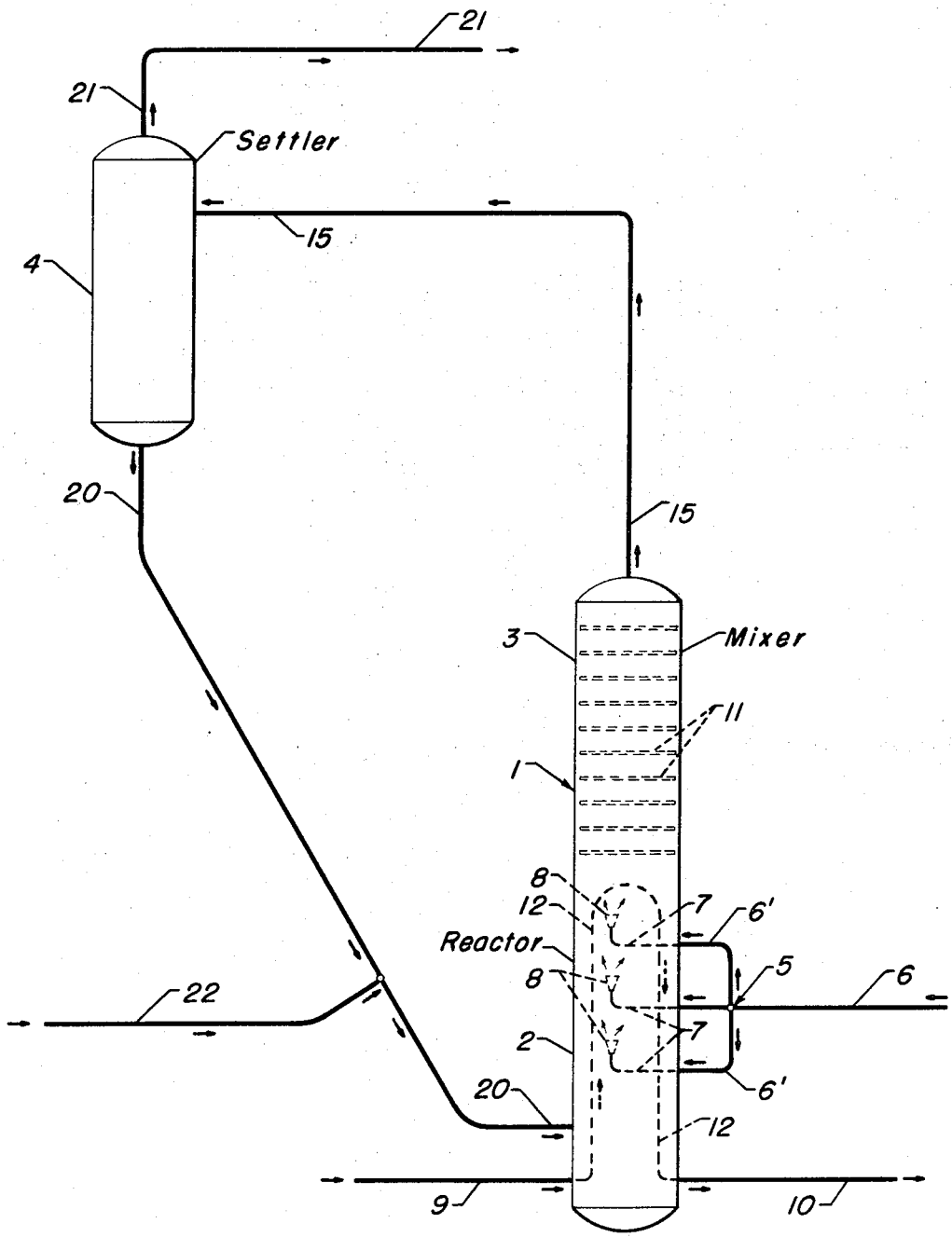

3,705,017
APPARATUS FOR A CATALYTIC REACTION
Edwin K. Jones, Kenilworth, Ill., assignor to Universal Oil Products Company, Des Plaines, Ill.
Filed Nov. 27, 1970, Ser. No. 93,346
Int. Cl. B01j 9/16
U.S. Cl. 23—288 E      1 Claim

ABSTRACT OF THE DISCLOSURE

An apparatus comprising the combination of a catalytic reaction chamber, a mixing chamber above the reaction chamber establishing turbulent flow of any unreacted reactants and the catalyst, and a settling chamber communicating with the downstream end of the mixing chamber and having a product outlet and a catalyst outlet. The settling chamber is disposed above the reaction chamber to thereby establish a continuous circuitous free flow of catalyst between the reaction chamber, mixing chamber and settling chamber.

---

The present invention relates to an improved means for effecting a catalytic reaction which provides for efficient mixing of the reactants and the catalyst and for an internal recirculation of the catalyst without use of costly pumping equipment.

The present apparatus is particularly adapted for use in effecting rapid and uniform mixing of reactant streams in the presence of a substantially immiscible catalyst having a different density or specific gravity than the reactants, as is carried out in the catalytic alkylation or polymerization of hydrocarbons. In an alkylation process, isoparaffins are reacted with olefins in the presence of mineral acid catalyst, such as hydrofluoric acid, sulfuric acid, or phosphoric acid. The reactants and catalyst are introduced into a reaction zone in a liquid state and they are maintained at a temperature suitable for conducting the desired reaction. Temperature control is particularly desirable in effecting the alkylation reaction in order to minimize the polymerization of the olefinic portion of the reactant stream. The polymerization effect is lessened by carrying out the reaction at a reduced temperature, so that it is particularly desirable to provide cooling in connection with the reaction zone in order to maintain optimum conversion.

In addition to the alkylation of olefins and isoparaffins, the present apparatus may well be utilized for other conversions, as, for example, the alkylation of an olefin with an aromatic, i.e., ethylene with benzene, to produce ethylbenzene in the presence of an acid catalyst.

Thus, it is a principal object of this invention to provide the means for effecting a catalytic reaction which provides for efficient mixing of the fluid reactants and catalyst without use of mechanical agitating means and which provides internal recirculation of the catalyst without use of costly pumping equipment.

In a broad aspect, the present invention provides an apparatus for a catalytic reaction permitting recycling of the catalyst which comprises: a reaction chamber having catalyst inlet means for introducing a liquid catalyst therein; feed inlet distribution means connected to said reaction chamber for introducing reactants into said chamber to admix the catalyst whereby a reaction product is formed; a mixing chamber communicating with the downstream end of said reaction chamber having mixing means therein for establishing turbulent flow of any unreacted reactants and catalyst whereby additional reaction product is formed; and, a settling chamber communicating with the downstream end of said mixing chamber, said settling chamber having a reaction product outlet in the upper portion thereof and a catalyst outlet in the lower portion thereof communicating with the catalyst inlet means of said reaction chamber, the settling chamber being disposed above said reaction chamber to establish a continuous and circuitous free flow of catalyst between the reaction chamber, mixing chamber and settling chamber. Of course, and particularly for utilization in an alkylation process, the apparatus as described above may be provided with heat exchange means disposed within the reaction chamber for maintaining predetermined conditions therein. In the case of the alklation of isoparaffins with olefins efficient cooling coils or tubes or other suitable cooling means may be provided in the reaction chamber as the heat exchange means.

In a preferred embodiment, the mixing chamber is disposed directly above the reaction chamber, and may in fact be an extension of the reaction chamber. The mixing means may compirse a plurality of vertically spaced baffle sections which will cause the reactants to admix to a greater extent that in the reaction chamber and thus provide time and space for the unreacted reactants to react to a further extent, thereby providing additional reaction product.

The feed inlet distribution means may include a plurality of spaced mixing nozzles contained within the reaction chamber, whereby the incoming reactants will mix with the incoming catalyst in the reaction chamber through the mixing chamber, and pass into the settling chamber.

Reference to the accompanying drawing and the following description thereof will serve to more fully illustrate the construction and arrangement of the present invention as well as set forth additional advantageous features thereof.

The drawing is a schematical elevational view of a preferred embodiment of the apparatus of this present invention. Referring to the drawing in more detail, there is shown a vertically disposed housing or chamber 1 which has a reactor portion or reaction zone 2 and a mixer portion or mixing zone 3. Connected above chamber 1 via a conduit 15 is a settler chamber 4.

Connected to the reaction zone is inlet conduit 20 for introducing a liquid catalyst into the reactor section. Also connected to the reaction zone 2 is the feed inlet distribution means 5 which comprises a conduit 6, a header 6', a plurality of conduits 7 and eduction nozzles 8. The feed inlet distribution means 5 is utilized for introducing the reactants into the chamber into admixture with the catalyst issuing from conduit 20. The nozzles 8 are spaced and are arranged in a manner whereby the incoming reactants will admix with the liquid catalyst through the reactor and subsequently through the mixing zone 3 and into the settler 4. Of course, other arrangements of feed inlet distribution means may be considered in the scope of this present invention, as for example, the reactants may be introduced through a series of perforated tubes with the perforations pointing upwardly. The present arrangement permits the reactants being introduced through conduit 6 to be distributed in a plurality of jet streams that are directed in the direction of flow of the catalyst from the eduction nozzle 8 and may effect an education and entrainment of the reactants with the catalyst issuing from conduit 20. The resulting fluid mixture is passed upwardly through the reactor portion 2 wherein a reaction product is formed.

It is desirable in most instances to provide for heat exchange equipment in a reactor section. Thus, conduits 9 and 10 are provided to connect to a heat exchange means within the reactor. In this particular arrangement, heat exchange means 12 is shown schematically and may comprise a plurality of tubes or coils disposed within the reactor section. Thus, if the reaction of the catalyst and reactants is exothermic a cooling media such as water may be introduced through conduit 9 to pass through the cooling coils and out conduit 10 to thus maintain predetermined temperature conditions within the reaction chamber 2. Of course, the contact time in reactor section 2 may vary depending upon the particular reaction taking place and the catalyst utilized.

After passing through the reactor section 2, the reactants and the catalyst along with any reactant product produced flow upwardly into the mixer portion 3 of chamber 1. In the mixer portion of the housing 1, turbulent flow is produced by mixing means disposed therein which may comprise perforated plates or baffle sections 11 vertically disposed within the mixing portion 3. The mixing means will aid in forming additional reaction products by more efficient mixing of the catalyst and the reactants. When the desired residence time in the mixer portion 3 has been reached, as preset by the geometry of the mixer, the total admixture passes through conduit 15 into the settler chamber 4. There the catalyst is settled from the reactant products and remaining reactants and is passed via line 20 back into the reactor without any costly pumping equipment. The only pump required would be placed on conduit 6 and would be sized to move the reactants along with the catalyst and product to the settler chamber 4 and to move the reactants and reactant product through conduit 21. If fresh catalyst is desired, it can be brought into line 20 via line 22. The reactant products are drawn off the top of the settler via line 21 for further refinement.

In the utilization of the present apparatus in effecting the conversion operation as, for example, in the aforementioned alkylation of an isoparaffin with an olefinic hydrocarbon in the presence of a liquid acid catalyst, the operation may be carried out in the following manner. A mixed reactant stream of olefinic and isoparaffinic hydrocarbons is introduced through conduit 6 and distributed through header 6' into conduits 7 and through the eduction nozzle 8. An acid catalyst phase, such as hydrofluoric acid, is brought into the lower portion of the reactor 2 via line 20. The acid catalyst phase is educted and entrained with the hydrocarbon phase so that there is an intimate mixing of the fluid mediums as as they pass upwardly through the reactor chamber. A cooling fluid meduim, such as water, is introduced through inlet 9 into the cooling means of the reactor system and withdrawn from outlet 10 to establish predetermined temperature conditions within the converter. The resulting alkylated hydrocarbons along with unreacted reactants flow into the mixer portion 3 of the chamber 1 where turbulence is established to more efficiently admix the liquids and thus produce more reactant product. After a suitable residence time, the alkylated hydrocarbons along with the catalyst are discharged into the settler chamber 4 to effect at least a partial separation such that the heavier catalyst phase settles to the lower portion of the settler chamber and flows in a gravity stream through conduit 20 to the lower end of the reaction zone whereby recirculation is maintained to provide contact with a continuously introduced reacting stream entering through the conduit 6. The product stream and entrained unreacted reacted fluids and acid being discharged through outlet 21 may be further refined with suitable equipment, not shown, and separated acid catalyst is returned to the reactor for further contact in the present apparatus.

It should be noted that the present apparatus provides a means where there occurs efficient mixing of reactants and catalyst and an internal recirculation of the catalyst within the reaction zone without the use of mechanical agitating means. It also provides for a means where the recirculation of the catalyst does not require a pump. In other words, the particular arrangement of the three basic components, the settler, reactor, and mixer, are such that the internal circulation of the liquid catalyst is by gravity flow and may be helped by eduction of the pumped reactant liquid. By eliminating a pump in the catalyst line, savings in repair and maintenance are realized. Furthermore, the overall efficiency of the circulation of catalyst, reactants, and product is improved considerably.

It is of course realized that the present embodiment is diagrammatic and minor modifications may be made with respect to shape and arrangement without departing from the scope of the present flow system. For example, the mixing portion of chamber 1 may be a separate chamber. Moreover, the three chambers may be combined as one with a partition separating the mixing and settling sections. Also, it is contemplated that other forms of baffling be used in the mixing chamber to establish turbulent flow.

As previously pointed out, the present improved apparatus may well be utilized for various reaction operations. In the alkylation of hydrocarbons in the presence of heavier acid catalyst phases, the arrangement of various proportions of the apparatus and the fluid inlets may be substantially as shown and described in the present drawing, however, in other types of conversions, it may be desirable to effect the introduction of the jet stream of reactant material at the upper end of the reaction section such that there is a downward flow through the reactor.

I claim as my invention:

1. A catalytic reaction apparatus comprising a vertically disposed reaction chamber having a catalyst inlet at the lower portion thereof, a plurality of vertically spaced reactant inlets above said catalyst inlet, each terminating in an upwardly directed eduction nozzle, a plurality of vertically spaced baffle sections in the upper portion of the chamber above said inlets and nozzles, a settling chamber externally of and disposed at a higher elevation than said reaction chamber, conduit means connecting the top of the reaction chamber with the upper portion of the settling chamber, and conduit means connecting the lower portion of the settling chamber with said catalyst inlet at the lower portion of the reaction chamber.

References Cited

UNITED STATES PATENTS

| | | | |
|---|---|---|---|
| 3,363,992 | 1/1968 | Chervenak | 23—288 E |
| 3,249,649 | 5/1966 | Sherk et al. | 23—288 E |
| 2,599,466 | 6/1952 | Lienhart | 23—288 E |

JAMES H. TAYMAN, JR., Primary Examiner

U.S. Cl. X.R.

23—288.5, 1 E; 208—143, 157